Oct. 9, 1928.
G. E. MOSHER
1,686,705
REMOVABLE WINDOW FOR CLOSED CARS
Filed Nov. 26, 1927
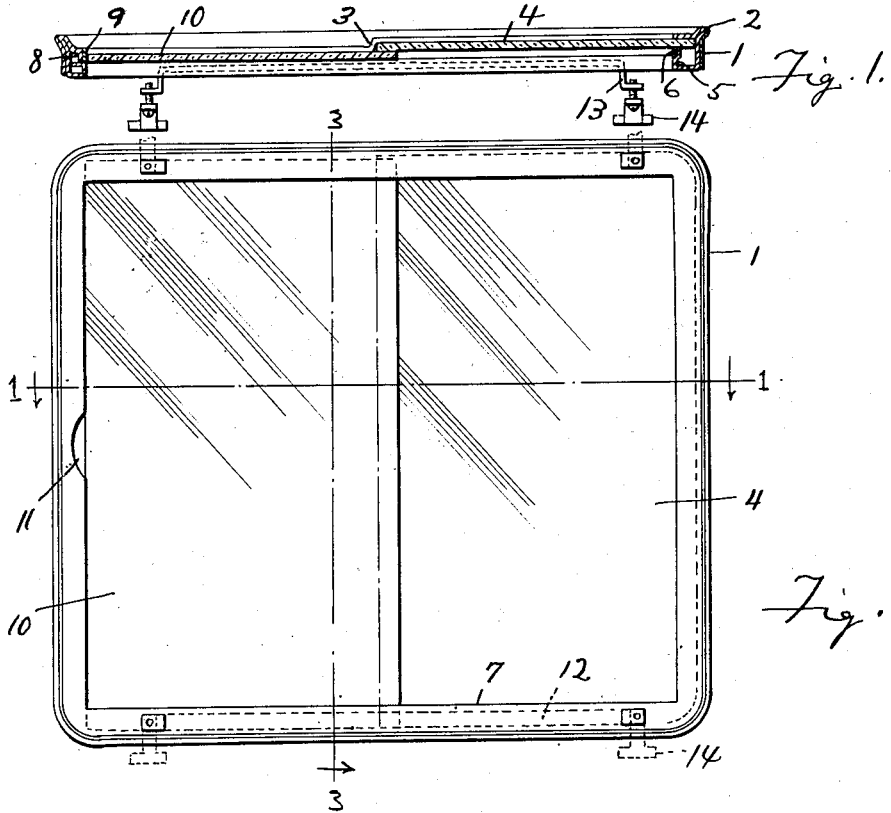
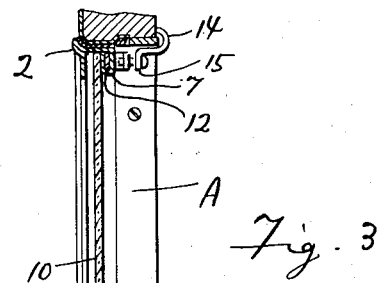
Inventor
Glenn E. Mosher
By Clarence A. O'Brien
Attorney Patented Oct. 9, 1928.

1,686,705

UNITED STATES PATENT OFFICE.

GLENN E. MOSHER, OF ROCKFORD, IOWA.

REMOVABLE WINDOW FOR CLOSED CARS.

Application filed November 26, 1927. Serial No. 235,868.

My invention relates to a removable window for closed types of automobiles, and is adapted for detachable association with the window opening in the door of a closed type of automobile preferably adjacent the driver's seat, whereby the same may be opened more quickly and with greater convenience, than the ordinary window, when it is desired to signal the direction in which the driver desires to turn the vehicle.

It is imperative in order to abide by present existing laws, that the driver of a closed type of car, must constantly keep the window adjacent his seat opened to give the proper arm signals to warn the rearwardly approaching vehicles of his intent to turn or stop.

The open window is quite agreeable during summer driving when the weather is clement, but however in inclement weather, the purpose of a closed type of car is defeated by this necessity of always keeping the window open in order to give signals.

The purpose of my invention, is to provide a removable window frame having slidable panes, which is adapted for mounted position within the window opening of the door adjacent the driver's seat, to allow the driver to readily slide one of the panes open, in order to effect a signal.

The main object is in providing a detachable window frame of the nature specified, wherein one of the panes thereof may be very quickly and conveniently actuated for opening the same, so that the driver may project his arm therethrough, and which may be equally convenient to close.

Other various novel objects will be noted, in the means employed for securing the frame within the window opening.

Other objects and advantages will become apparent as my invention is better understood from the specification and claim to follow.

In the drawings:—

Figure 1 illustrates a horizontal sectional view through the window frame and pane thereof, and taken substantially on the line 1—1 of Fig. 2, looking in the direction of the arrows.

Fig. 2 represents an inner side elevation of the elevation of the frame, and pane, while Fig. 3 is a vertical sectional view taken substantially on the line 3—3 of Fig. 2, and looking in the direction of the arrow.

Now for a more detailed description of my invention, I refer to the drawings in which like numerals designate like parts. For the purpose of illustrating the manner in which my improved detachable window is associated with the enclosed type of automobile, I designate in the drawings, a fragmentary portion of the usual door construction, formed with the window opening A. The lower portion of the door has the usual space B, in which the usual window pane C is adapted to be disposed when the opening is unclosed.

This novel window includes a substantially rectangular frame 1, constructed of sheet metal. The frame is substantially U-shaped in cross section, while an obliquely disposed rib 2 is formed at the outer face of the frame, and adapted to engage over the head of the window opening in the vehicle door.

The front face of the frame is offset at 3, to fix the stationary pane 4 against movement. The inner portion of the frame has its forward vertical section bent inwardly at 5, and formed with a groove along its edge portion in which a packing strip 6 may be disposed. The lower horizontal section of the frame, at the inner side, thereof, is bent inwardly at 7, and from thence downwardly in spaced relation to itself. The upper inner section of the frame is likewise formed, while the rearward vertical inner portion of the frame is bent inwardly, and then rearwardly at 7.

The outer portion of the frame, which is vertical, at the rear end thereof, is formed with an inwardly bent flange 8 adapted to abut the rearwardly bent flange 7, of the inner portion. The packing strip 9 is secured against this flange 8 to afford a resilient stop for the outer edge of the slidable pane 10.

The pane 10 is slidable between the outer flange and the inner flange of the horizontal portion of the frame. This frame is adapted to have its inner end in overlapping relation with the adjacent end of the stationary pane 4, so as to assist in the maintaining of the pane 4, rigidly in position. As is clearly shown in Fig. 2 of the drawings, a depression 11 is formed in the rear vertical section of the frame, whereby the slidable pane may be readily gripped for the purpose of sliding the same within the frame.

Both of the upper and lower inner horizontal sections of the frame are bent inwardly in parallel relation with itself in the manner before described, to provide a space, in which elongated bars 12 may be disposed. The end portions of the respective bars are adapted to project through the inner portion of the frame, and adjacent the ends thereof, the manner designated by numeral 13.

The projecting end portions of these bars are bent into parallelism with the horizontal sections of the frame, and formed with threaded openings. Hook members 14 are provided with laterally bent portions 15, having threaded openings therein. Screw members 16, are threadable through the threaded opening in the hook members and adapted to be threaded through the threaded openings in the ends of the bars 12, so that when the hook members are disposed in hooked relation with the inner side of the vehicle door, as shown in Fig. 3, the screw members may be further threaded through the ends of the bars for tightly securing the frame within the window opening.

It will thus be seen that I have provided, a very novel removable frame, adapted in the manner hereinbefore described, which will be very beneficial in use, to drivers of motor vehicles, under the circumstances, set out in the objects of this invention. Whereas the preferred embodiment of my invention has been disclosed in the drawing, it is to be known that the same may be slightly modified in form without in any manner, exceeding the scope of the invention, or the claim appended.

Having thus described my invention, what I claim as new is:—

In a removable window adapted for disposition within the usual window opening of the closed type of automobile, a frame, a stationary pane supported within said frame, a slidable pane arranged within the frame, a flange at the upper and lower portions of the frame, said flanges being bent inwardly, an elongated bar adapted to be secured to the frame at the upper and lower portions thereof by said inwardly bent flanges, the ends of each bar being bent outwardly, and means associated with said bent ends for securing the frame within the window opening.

In testimony whereof I affix my signature.

GLENN E. MOSHER.